United States Patent [19]
Hoffman et al.

[11] Patent Number: 6,144,718
[45] Date of Patent: Nov. 7, 2000

[54] FLEXIBLE CABLE CONNECTION FOR DETECTOR MODULE

[75] Inventors: David M. Hoffman, New Berlin; August O. Englert, Waukesha, both of Wis.

[73] Assignee: General Electric Company, Milwaukee, Wis.

[21] Appl. No.: 08/979,924

[22] Filed: Nov. 26, 1997

[51] Int. Cl.[7] .................................................. G01N 23/00
[52] U.S. Cl. .................................................................. 378/19
[58] Field of Search ................................................. 378/19

[56] References Cited

U.S. PATENT DOCUMENTS

| | | |
|---|---|---|
| 4,464,776 | 8/1984 | Erker . |
| 4,965,726 | 10/1990 | Heuscher et al. ........................ 378/19 |
| 5,499,281 | 3/1996 | Weedon .................................. 378/19 |
| 5,592,523 | 1/1997 | Tuy et al. . |

Primary Examiner—Craig E. Church
Attorney, Agent, or Firm—Armstrong, Teasdale; Christian G. Cabou; Phyllis Y. Price

[57] ABSTRACT

A flexible cable connection for a detector module is described. The flexible cable allows photodiode output signals to be coupled to the CT system without the need of attaching a pin connector to the photodiode outputs. Wires from the flexible cable are wire bonded to the photodiode output signals eliminating possible damage to the photodiode when the pin connector is attached.

16 Claims, 4 Drawing Sheets

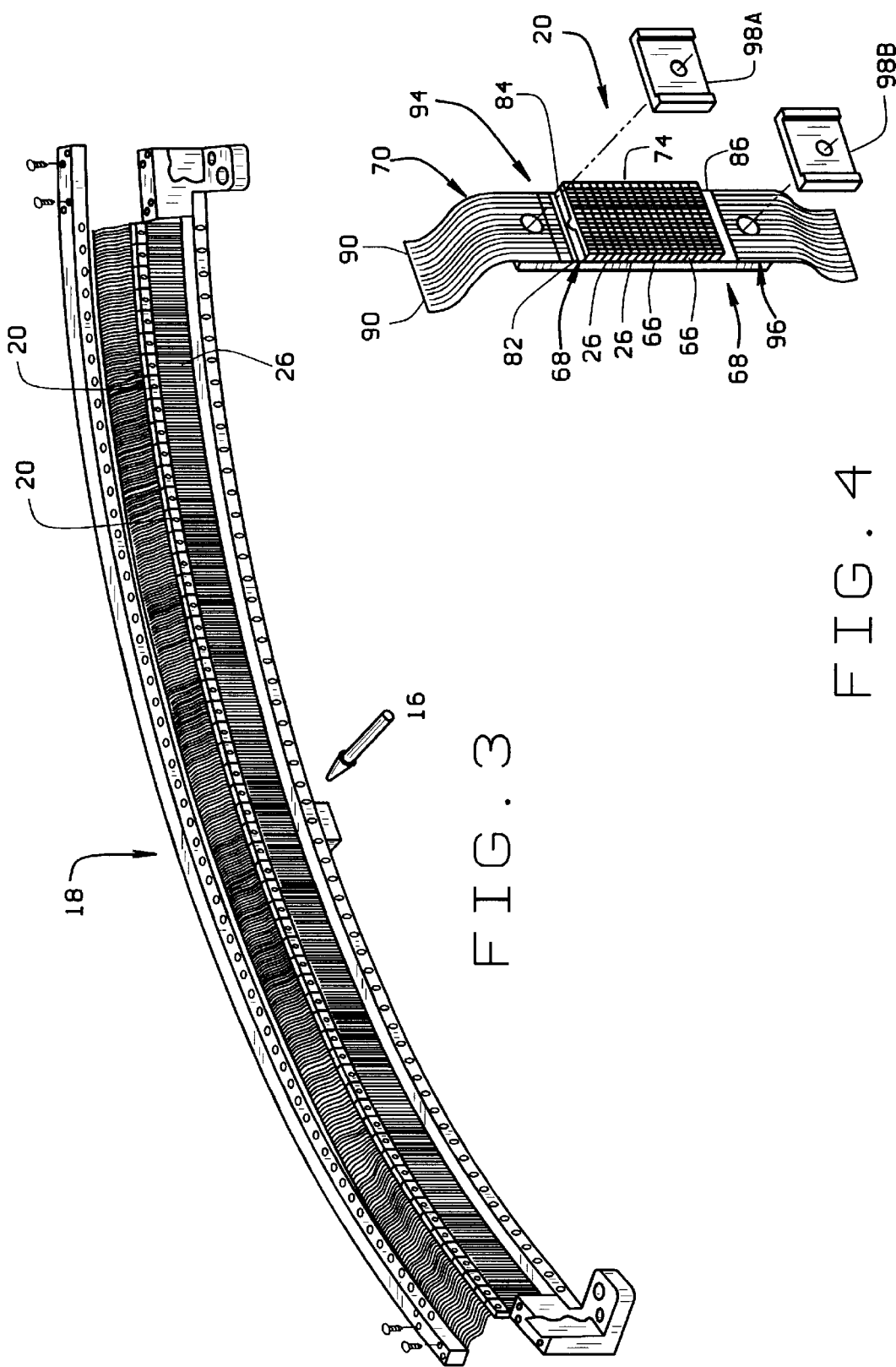

FLEXIBLE CABLE CONNECTION FOR DETECTOR MODULE

FIELD OF THE INVENTION

This invention relates generally to computed tomograph imaging and, more particularly, to coupling the electrical signals from the x-ray beam detection module to a data acquisition system.

BACKGROUND OF THE INVENTION

In at least some computed tomograph (CT) imaging system configurations, an x-ray source projects a fan-shaped beam which is collimated to lie within an X-Y plane of a Cartesian coordinate system and generally referred to as the "imaging plane". The x-ray beam passes through the object being imaged, such as a patient. The beam, after being attenuated by the object, impinges upon an array of radiation detectors. The intensity of the attenuated beam radiation received at the detector array is dependent upon the attenuation of the x-ray beam by the object. Each detector element of the array produces a separate electrical signal that is a measurement of the beam attenuation at the detector location. The attenuation measurements from all the detectors are acquired separately to produce a transmission profile.

In known third generation CT systems, the x-ray source and the detector array are rotated with a gantry within the imaging plane and around the object to be imaged so that the angle at which the x-ray beam intersects the object constantly changes. X-ray sources typically include x-ray tubes, which emit the x-ray beam at a focal spot. X-ray detectors typically include a collimator for collimating x-ray beams received at the detector, a scintillator adjacent the collimator, and photodiodes adjacent the scintillator.

Multislice CT systems are used to obtain data for an increased number of slices during a scan. Known multislice systems typically include detectors generally known as 3-D detectors. With such 3-D detectors, a plurality of detector elements form separate channels.

Each detector module of the 3-D detector array has several times more output signals than known 1-D detectors. Electrically coupling these signals to the CT system requires a pin connector or a printed wiring board to be mechanically connected to the detector module. However, as the number of signals becomes larger so does the size of the pin connector. As a result of the insertion force of the larger pin connector, the detector module may be damaged as the connector is coupled to the module.

Accordingly, it would be desirable to provide a detector module that eliminates the need to mechanically couple a pin connector or printed wiring board to the detector module. It would also be desirable to provide a detector module that allows a high density of signals to be electrically coupled to a flexible cable.

SUMMARY OF THE INVENTION

These and other objects may be attained by a detector module having a plurality of detector elements. Each detector element includes a photodiode electrically coupled to a flexible cable. In one embodiment, each photodiode output line is electrically connected to an input line of a field effect transistor (FET) array and each output and control line of the FET array is electrically connected to a wire in the flexible cable.

The detector module is fabricated by depositing, or forming, a photodiode array and the FET array onto a substrate. The flexible cable first ends are placed adjacent to the FET array and coupled to the substrate so that the cable wires are adjacent the FET array output lines. The FET array input and output lines are then electrically connected to the photodiode output lines and the flexible cable. Particularly, the FET array input lines are wire bonded to the photodiode output lines so that an electrical connection is created between each photodiode output and each FET array input. The FET array output and control lines are then wire bonded to the flexible cable wires so that an electrical connection is created between each FET output and a wire and each FET control and a wire. The electrical connections are completed using various wire bonding techniques, including, for example, aluminum wire wedge bonding and gold wire ball bonding.

The above described detector module enables a large number of high density photodiode output lines to be electrically connected to a flexible cable. In addition, the described detector module eliminates the need to mechanically couple a pin connector to the photodiode output lines.

BRIEF DESCRIPTION OF THE DRAWINGS

FIG. 3 is a perspective view of a CT system detector array in accordance with the present invention.

FIG. 4 is a perspective view of a detector module shown in FIG. 3.

DETAILED DESCRIPTION

Figure 1:
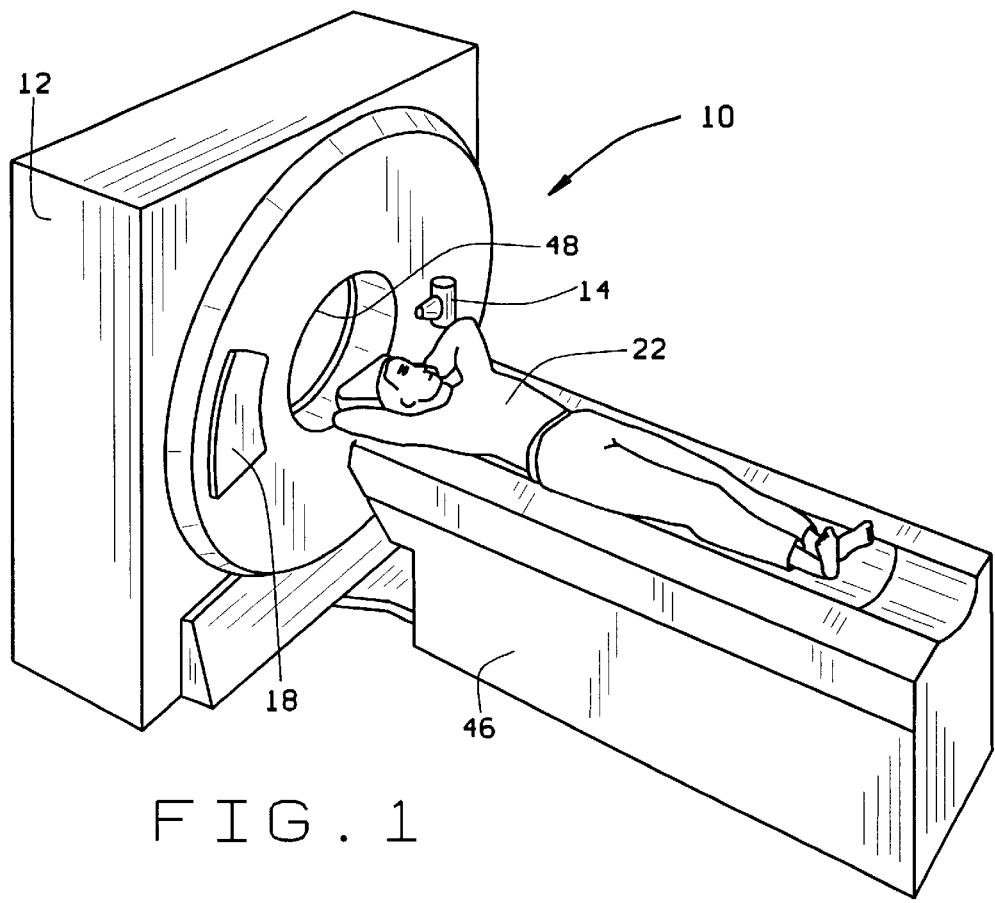
FIG. 1 is a pictorial view of a CT imaging system.
Figure 2:
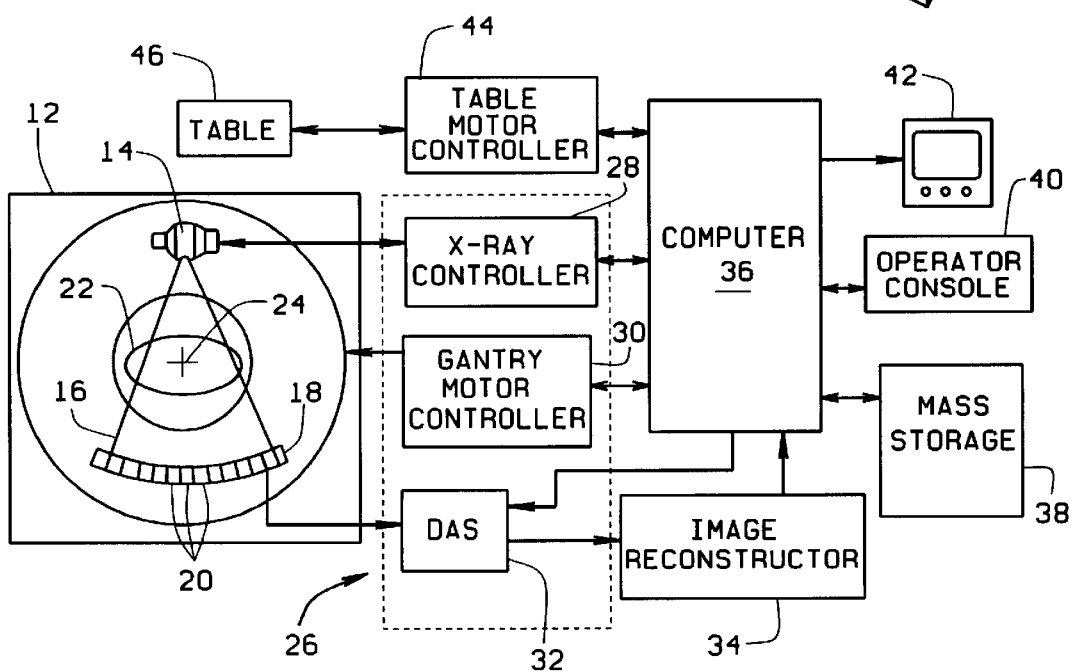
FIG. 2 is a block schematic diagram of the system illustrated in FIG. 1.

Referring to FIGS. 1 and 2, a computed tomography (CT) imaging system 10 is shown as including a gantry 12 representative of a "third generation" CT scanner. Gantry 12 has an x-ray source 14 that projects a beam of x-rays 16 toward a detector array 18 on the opposite side of gantry 12. Detector array 18 is formed by detector modules 20 which together sense the projected x-rays that pass through a medical patient 22. Each detector module 20 produces an electrical signal that represents the intensity of an impinging x-ray beam and hence the attenuation of the beam as it passes through patient 22. During a scan to acquire x-ray projection data, gantry 12 and the components mounted thereon rotate about a center of rotation 24.

Rotation of gantry 12 and the operation of x-ray source 14 are governed by a control mechanism 26 of CT system 10. Control mechanism 26 includes an x-ray controller 28 that provides power and timing signals to x-ray source 14 and a gantry motor controller 30 that controls the rotational speed and position of gantry 12. A data acquisition system (DAS) 32 in control mechanism 26 samples analog data from detector modules 20 and converts the data to digital signals for subsequent processing. An image reconstructor 34 receives sampled and digitized x-ray data from DAS 32 and performs high speed image reconstruction. The reconstructed image is applied as an input to a computer 36 which stores the image in a mass storage device 38.

Computer 36 also receives commands and scanning parameters from an operator via console 40 that has a keyboard. An associated cathode ray tube display 42 allows the operator to observe the reconstructed image and other data from computer 36. The operator supplied commands and parameters are used by computer 36 to provide control signals and information to DAS 32, x-ray controller 28 and gantry motor controller 30. In addition, computer 36 operates a table motor controller 44 which controls a motorized table 46 to position patient 22 in gantry 12. Particularly, table 46 moves portions of patient 22 through a gantry opening 48.

As shown in FIGS. 3 and 4, detector array 18 includes a plurality of detector modules 20. Each detector module includes an array of detector elements 26. Particularly, each x-ray detector module 20 includes a plurality of photodiodes 66, a semiconductor device 68, and at least one flexible electrical cable 70. Scintillators 74, as known in the art, are positioned above and adjacent photodiodes 66. Photodiodes 66 may be individual photodiodes or a multi-dimensional photodiode array. Photodiodes 66 are optically coupled to scintillators 74 and generate electrical output lines 82 representative of the light output by scintillators 74. Each photodiode 66 produces a separate electrical output 82 that is a measurement of the beam attenuation for a specific element 26. Photodiode output lines 82 may, for example, be physically located on one side of module 20 or on a plurality of sides of module 20. As shown in FIG. 4, photodiode outputs 82 are located at top and bottom of the photodiode array.

Semiconductor device 68, in one embodiment, includes two semiconductor switches 84 and 86. Switches 84 and 86 each include a plurality of field effect transistors (FET) (not shown) arranged as a multidimensional array. Each FET includes an input line electrically connected to a photodiode output 82, an output line, and a control line (not shown). FET output and control lines are electrically connected to flexible cable 70. Particularly, one-half of photodiode output lines 82 are electrically connected to each FET input line of switch 84 with the remaining one-half of photodiode output lines 82 electrically connected to the FET input lines of switch 86.

Figure 5:
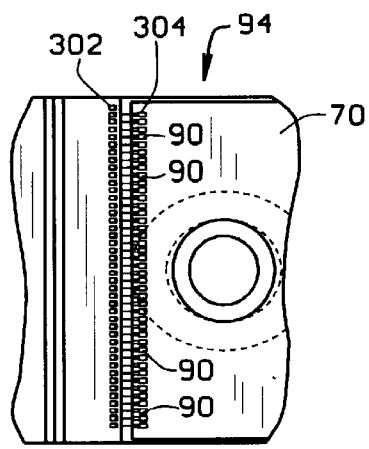
FIG. 5 is an enlarged view of a detector module to cable interconnection of the present invention.

Flexible electrical cable 70 includes a first end (not shown), a second end (not shown) and a plurality of electrical wires 90 traveling therebetween. Cable 70 may, for example, be a single cable having multiple first ends 94 and 96 or in an alternative embodiment, may include multiple cables (not shown) each having a first end (not shown). As shown in FIG. 5, representative of first end 94, FET output and control lines are electrically connected to cable 70. Particularly, each FET output and control line is wire bonded to a wire 90 of cable first ends 94 and 96. FET output and control lines are wire bonded to wires 90 in the same manner as photodiode outputs 82 are wire bonded to the FET input lines. Cable first ends 94 and 96 are secured to detector module 20 using mounting brackets 98A and 98B.

Figure 6:
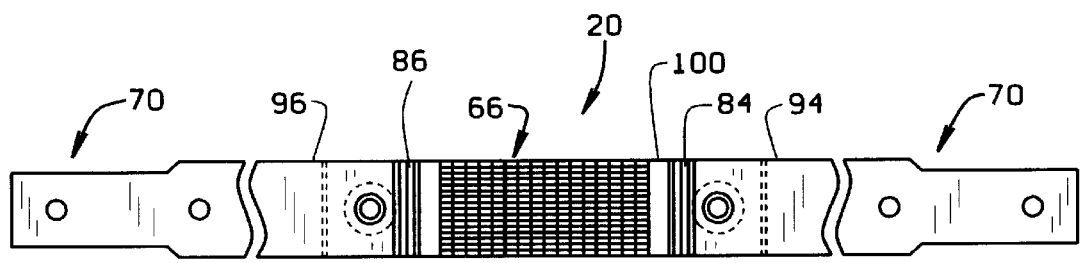
FIG. 6 is a top view of a detector module shown in FIG. 4.
Figure 7:
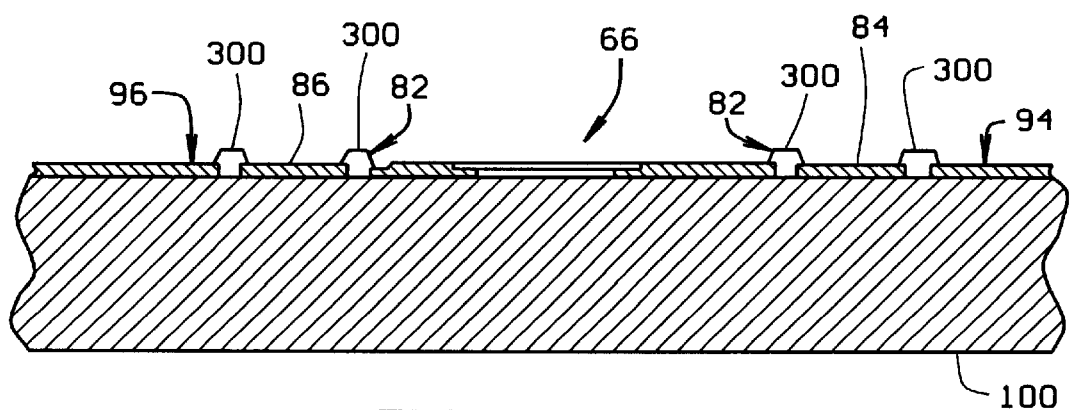
FIG. 7 is a side view of detector module shown in FIG. 6.

In one embodiment as shown in FIGS. 5, 6, and 7, and with respect to detector module 20, photodiodes 66 and switches 84 and 86 are deposited, or formed, on substrate 100 so that photodiodes 66 are positioned adjacent and between switches 84 and 86. The FET input lines are then electrically connected to photodiode outputs 82. Particularly, about one-half of photodiode outputs 82 are wire bonded to switch 84 input lines and about one-half of photodiode outputs 82 are wire bonded to switch 86 input lines so that an electrical path is created between each output 82 and each FET input line. Switch input lines may be wire bonded to photodiode outputs 82 using various wire bonding techniques, including, for example, aluminum wire wedge bonding and gold wire ball bonding as known in the art.

Referring to FIG. 5, wire bonds are generally identified as bonds 300 and extend between pads 302 and 304. Pads 302 are electrically connected to the FET output and control lines. Pads 304 are electrically connected to wires 90.

After connecting outputs 82, respective cable first ends 94 and 96 are positioned adjacent to respective switches 84 and 86 and coupled to substrate 100 using, for example, an adhesive (not shown). FET output lines are then wire bonded to wires 90 so that an electrical path is created between each FET output line and a wire 90. Similarly, FET control lines are wire bonded to wires 90 so that an electrical path is created between each FET control line and a wire 90. Cable first ends 94 and 96 are then secured using mounting brackets 98A and 98B.

After mounting detector modules 20 into detector array 18, cable second ends are coupled to DAS 32 so that an electrical path exists between the photodiode outputs 82 and DAS 32 and FET control lines are electrically connected to DAS 32 to enable semiconductor device FETs.

The described detector module enables a large number of high density photodiode output signals to be electrically connected to a flexible cable. Additionally, as a result of the wire bonding of the wires to the semiconductor device output lines, a pin connector is not required to be connected to detector module. Additionally, eliminating the connection of the pin connector avoids subjecting the detector module to the insertion force of the pin connector and the potential damage associated with making such a connection.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

What is claimed is:

1. An x-ray beam detector module for a computed tomograph machine, said module comprising:
   a scintillator;
   a substrate;
   a photodiode optically coupled to said scintillator and deposited on said substrate;
   a flexible electrical cable electrically connected at one end to an output of said photodiode; and
   a switch deposited on said substrate, said switch electrically coupled between said photodiode output and said flexible electrical cable, said switch wire bonded to said flexible electrical cable, and said flexible electrical cable adhesively bonded to said substrate.

2. An x-ray beam detector module in accordance with claim 1 wherein said flexible electrical cable is adhesively coupled to, and said photodiode and said switch are deposited on, one side of said substrate.

3. An x-ray beam detector module in accordance with claim 1 wherein said switch is a first switch of a pair of switches deposited on said substrate, and said flexible electrical cable is a first cable of a pair of said flexible electrical cables adhesively coupled to said substrate, wherein each said electrical cable is wire bonded to one of said switches, and wherein said photodiode is electrically coupled to both said switches and is positioned adjacent and between said pair of switches.

4. An x-ray beam detector module in accordance with claim 2 wherein said switch comprises a field effect transistor.

5. An x-ray beam detector module in accordance with claim 2 wherein said switch comprises a plurality of field effect transistors.

6. An x-ray beam detector module in accordance with claim 5 wherein said flexible electrical cable comprises a plurality of electrical wires, each of said field effect transistors wire bonded to one of said electrical wires.

7. An x-ray beam detector module in accordance with claim 6 wherein each of said field effect transistors are wire bonded to one of said electrical wires.

8. An x-ray beam detector module in accordance with claim 1 wherein said photodiode comprises a multidimensional photodiode array.

9. An x-ray beam detector module in accordance with claim 1 wherein said switch is wire bonded to said photodiode output.

10. A method for fabricating an x-ray beam detector module for a computed tomograph machine, the module including a scintillator, a photodiode optically coupled to the scintillator, and a switch electrically coupled to an output of said photodiode, said method comprising the steps of:

depositing the photodiode and the switch on a substrate;

positioning one end of a flexible electrical cable adjacent an output of the switch;

wire bonding the cable to the switch; and adhesively coupling the flexible electrical cable to the substrate.

11. A method in accordance with claim 10 wherein the photodiode comprises a multidimensional photodiode array, the switch includes a plurality of field effect transistors, and the flexible cable includes a plurality of wires, and positioned one end of the flexible cable adjacent an output of the switch comprises the step of positioned one end of each wire adjacent one of the respective field effect transistors.

12. A method in accordance with claim 9 wherein wire bonding the cable to the switch comprises the step of aluminum wire wedge bonding the cable to the switch.

13. A method in accordance with claim 9 wherein wire bonding the cable to the switch comprises the step of gold wire ball bonding the cable to the switch.

14. A method in accordance with claim 10 wherein the flexible electrical cable is adhesively coupled to a side of the substrate to which the switch is deposited.

15. A method in accordance with claim 10 wherein:

said step of depositing the photodiode and the switch on the substrate comprise the step of depositing a first switch adjacent to the photodiode;

said step of wire bonding the cable to the switch comprises the step of bonding a first cable to the first switch;

and further comprising the steps of:

depositing a second switch adjacent to the photodiode so that the photodiode is positioned between the first switch and the second switch;

wire bonding a second flexible electrical cable to the second switch;

adhesively coupling the flexible electrical cable to the substrate; and electrically coupling both the first switch and the second switch to the photodiode.

16. A method in accordance with claim 10 and further comprising the step of wire bonding the switch to the photodiode output.

* * * * *

UNITED STATES PATENT AND TRADEMARK OFFICE
CERTIFICATE OF CORRECTION

PATENT NO.   : 6,144,718
DATED        : November 7, 2000
INVENTOR(S)  : David M. Hoffman et al.

It is certified that error appears in the above-identified patent and that said Letters Patent is hereby corrected as shown below:

Column 6, claim 12,
Line 3, delete "9" and substitute -- 10 --.

Column 6, claim 13,
Line 6, delete "9" and substitute -- 10 --.

Signed and Sealed this

Twentieth Day of November, 2001

*Attest:*

*Nicholas P. Godici*

NICHOLAS P. GODICI
*Attesting Officer*       *Acting Director of the United States Patent and Trademark Office*